Sept. 20, 1966     E. G. SHANNON     3,273,661
BOAT TRAILER AND LAUNCHER
Filed Feb. 17, 1965     2 Sheets-Sheet 1
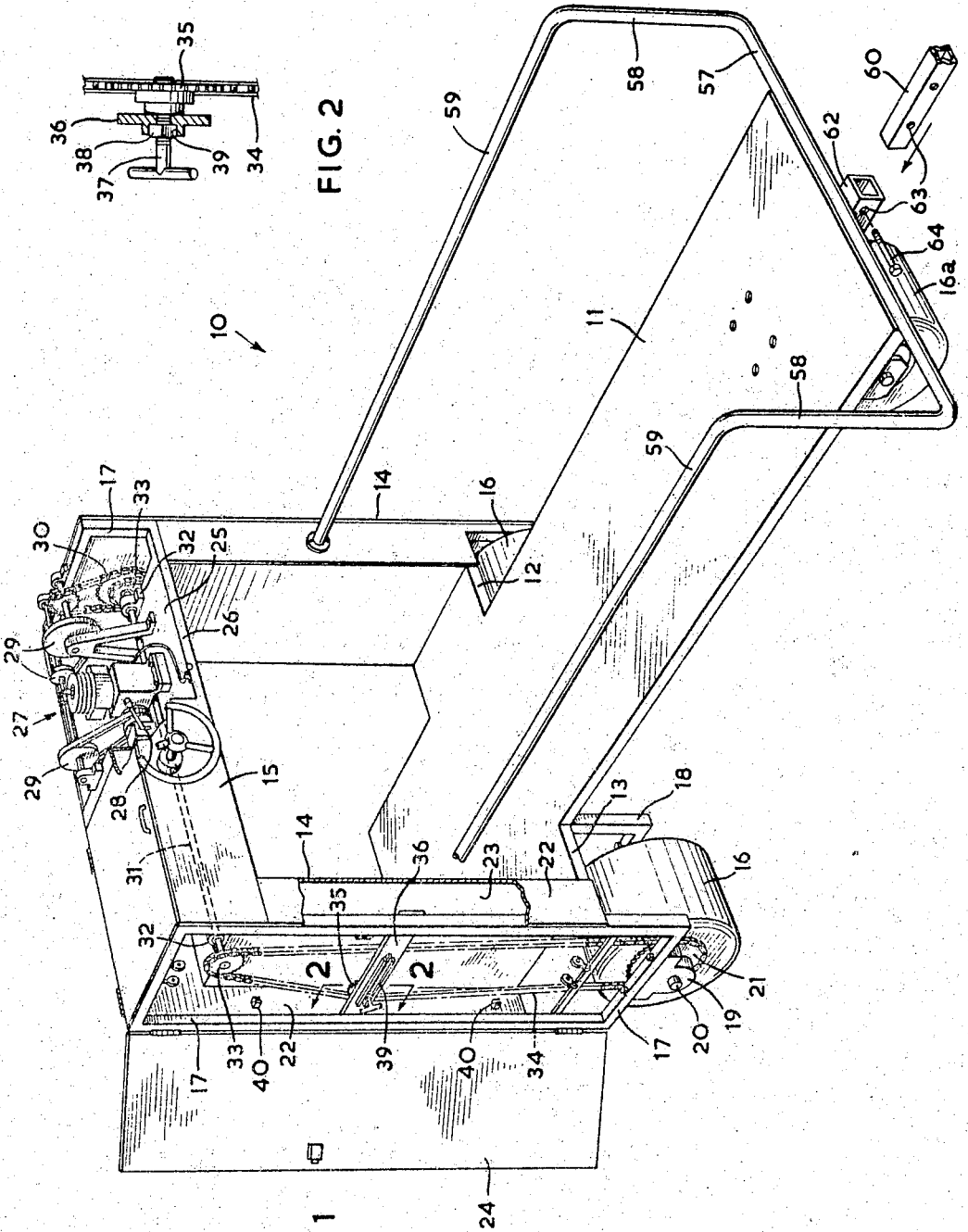
INVENTOR.
EUGENE G. SHANNON
BY~ Maybee & Legris
ATTORNEYS Sept. 20, 1966     E. G. SHANNON     3,273,661
BOAT TRAILER AND LAUNCHER
Filed Feb. 17, 1965     2 Sheets-Sheet 2
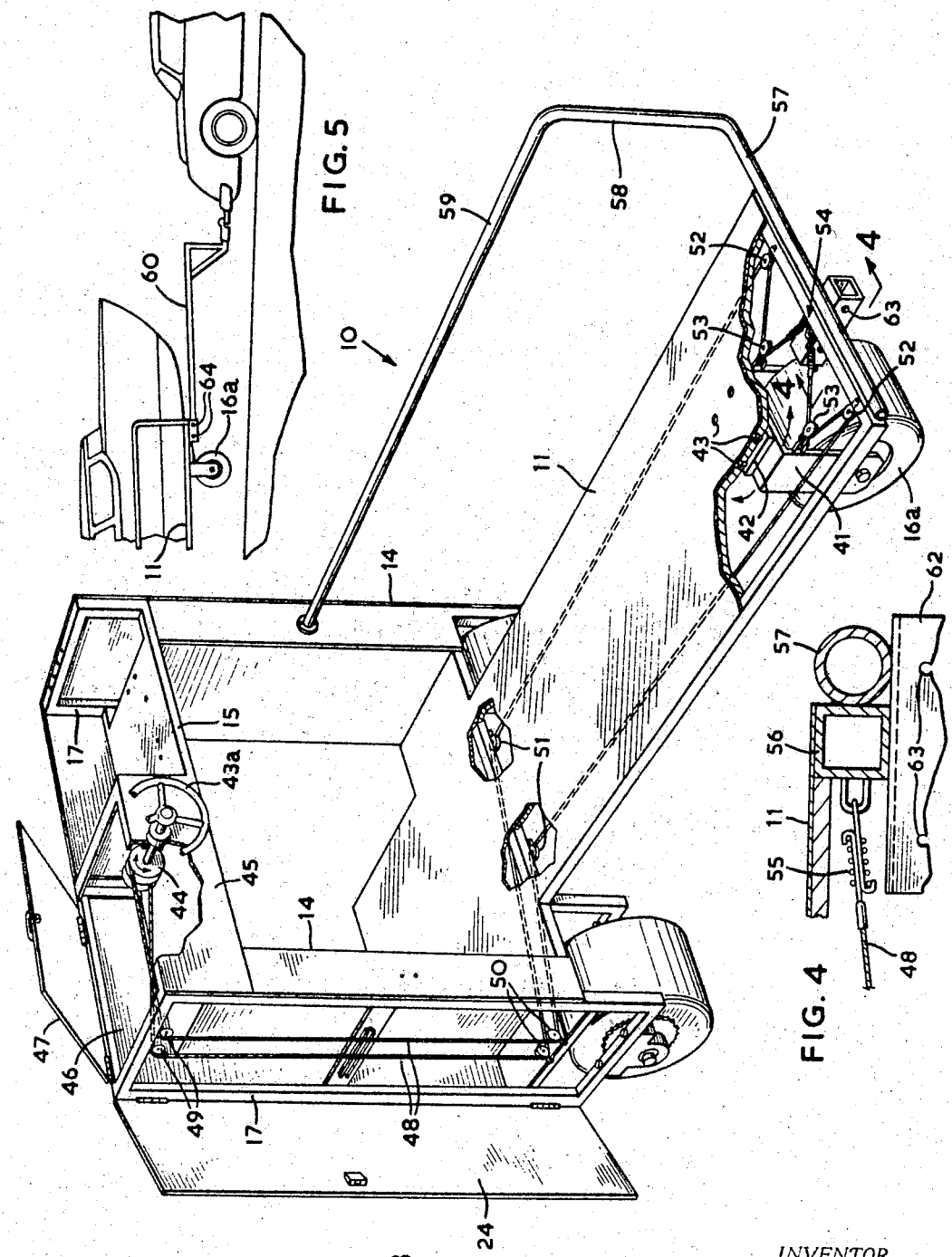
INVENTOR.
EUGENE G. SHANNON
BY~ Maybee & Legris
ATTORNEYS

United States Patent Office 3,273,661
Patented Sept. 20, 1966

3,273,661
BOAT TRAILER AND LAUNCHER
Eugene G. Shannon, 215 Courtleigh Blvd.,
Toronto, Ontario, Canada
Filed Feb. 17, 1965, Ser. No. 433,324
3 Claims. (Cl. 180—27)

This invention relates generally to the land transport and launching of small pleasure boats of the kind generally seen on inland lakes in summertime, and relates particularly to a vehicle upon which such small craft can be secured and which is adapted both for trailing behind a car or truck and for driving into the water under its own power to launch the craft.

Hitherto, most small craft launchings have been done, other than by simple manual carrying, by means of trailers which are backed into the water until they are submerged, at which point the boat floats free. There are, however, many situations in which it is not feasible to back the trailer into the water while still attached to the car or truck, for example where the shore bordering the lake is hard enough to support the weight of the trailer but not that of a car, or where the slope of the lake bottom near the shore is very gradual.

The object of this invention is to provide a trailable vehicle upon which a boat can be trailed, but which can also function as a self-powered device, capable of driving into the water at a lake shore to launch the craft it contains.

It is a further object of this invention to provide a boat launcher and trailer capable of functioning on soft and marshy terrain where heavier vehicles, like cars and trucks, cannot.

It is yet a further object of this invention to provide a self-propelled boat launcher and trailer that can be driven by a person standing within the boat contained by the launcher so that there is no need for the person to enter the water during the launching.

One embodiment of this invention is shown in the accompanying drawings, in which like numbers refer to like parts throughout, and in which:

FIG. 1 is a partly broken away perspective view of a vehicle constructed according to the invention;

FIG. 2 is a sectional view taken at line 2—2 in FIG. 1;

FIG. 3 is also a partly broken away perspective view of the device of FIG. 1, but reveals different components;

FIG. 4 is a sectional view taken at line 4—4 of FIG. 3; and

FIG. 5 is a partial schematic view of the device of FIG. 1 being trailed behind a vehicle.

In FIG. 1 the device shown generally at 10 comprises a platform 11 having two lateral extensions 12 and 13. Above each of the lateral extensions 12 and 13 rises a column 14. A cross member 15 is supported at the upper ends of and bridges between the columns 14. Under each of the columns 14 is a wide, low-pressure tire 16, while beneath the right-hand end of the platform 11, hereinafter called the front end, is a third wide, low-pressure tire 16a.

The structure and components of the crossmember 15 and the columns 14 will now be described in detail.

The columns 14 are identical, and so a description of the left-hand column will suffice for both. The skeleton of the column 14 consists of a rectangular, vertically oriented steel frame 17, most of which extends above the platform 11 and a small portion of which extends below the platform. A small U-shaped frame 18, identical to the portion of the frame 17 which extends below the platform 11, is located inwardly of the frame 17 and is affixed to the platform 11. Bolted to the bottom members of each of frames 17 and 18 is a bearing member 19 (only the outer one visible). A shaft 20 is journalled in the bearing block 19, and supports the wide, low-pressure tire 16. A chain drive sprocket 21 is fixed to the tire 16 to turn therewith.

The column 14 is rectangular in horizontal cross-section and has walls made of sheet steel. Thus, the column 14 comprises edge walls 22, an inner wall 23 and an access door 24, hinged to the rearward upright of the frame 17.

Turning now to the cross-member 15, this can be seen in FIG. 1 to comprise a lower, steel mounting plate 25, under the front edge of which extends a steel bar support 26 which reaches between the two frames 17 in the columns 14. The right-hand half of the cross-member 15 is unenclosed, and has mounted upon it a gasoline engine 27 which is of the standard variety and need not be described in detail. Through a manual clutch means 28, the motive power or torque of the engine 27 is transmitted by a system of belted sheaves 29 and a small chain drive 30 to a shaft 31 which is mounted for rotation in journal bearings 32.

At either end of the rotatable shaft 31 is affixed a driving chain sprocket 33. A transmission claim 34 is looped over the sprocket 33 and the sprocket 21, and transmits power from the shaft 31 to the tire 16.

When the device 10 is to be merely trailed behind another powered vehicle, like a car, the tires 16 can be allowed to rotate freely by disengaging the chain 34 from the sprocket 21 in the manner now to be described. The chain 34 is made somewhat longer than the length which would allow it to be tightly strung between the sprockets 21 and 33, in order that it may be engaged and disengaged from the sprockets. The slack in the chain 34 is taken up by a horizontally slidable free-running sprocket 35 which can be fixed at any given position. A horizontal bar 36 extends between the vertical members of the frame 17, and carries the sprocket 35. As shown in FIG. 2, the sprocket 35 turns freely upon a shaft 37, at the remote end of which is a manual T-grip. The central portion of the shaft 37 has threads and is threaded through a captive nut 38 which is held slidably but non-rotatably within a groove 39. The sprocket 35 can thus be clamped into any given position by turning the shaft 37 in one direction, and can be loosened to slide horizontally by turning the shaft in the other direction.

When the device 10 is being towed behind another powered vehicle, the chain 34 is held up out of the way of the turning sprocket teeth on the sprocket 21 by clips 40.

Turning now to FIG. 3, the means by which the device 10 is steered when under its own power will be described. As shown, the tire 16a is journalled to rotate freely within a U-shaped yoke 41, which is pivotable about a vertical axis with respect to a plate 42 bolted to the underside of the platform 11 by four, counter-sunk bolts 43.

A common boat steering wheel 43a, with the usual drums 44, is mounted on the front wall 45 of the enclosed, left-hand portion of the cross-member 15. This enclosure is completed by a rear wall 46 (extending all the way between the frames 17), and an upper, hinged access door 47.

Cables 48 are wound in the usual manner around the drums 44, are led through pairs of pulleys 49, 50, 51, 52 and 53, and are secured at 54. As shown, the pulleys of pair 53 are attached one on either arm of the yoke 41.

As shown in FIG. 4, the ends of the cable 48 are attached to well-known compression spring devices 55, which are in turn attached to the frame member 56 of the platform 11. The compression spring devices 55 take up the cable slack.

It can be readily seen that rotation of the steering wheel 43a will cause the tire 16a to rotate about its vertical axis for steering.

A round bar 57 extends across the front end of the platform 11 and beyond, where it is bent upwardly to form two vertical portions 58, both of which merge into rearward, horizontal portions 59 connected at their rearward ends to the columns 14.

FIG. 5 shows the manner in which a stepped trailer tie-rod 60 can be used to hitch the front end of the device 10 to the back of a vehicle for trailing therebehind with the front end tire 16a raised clear of the ground. FIG. 1 shows the end portion of the tie rod 60 in a position to be inserted into a hitching socket 62 which is secured to the frame member 56. The tie rod 60 and the hitching socket 62 have corresponding bores 63 through which bolts 64 can be inserted.

Any common boat-securing means, such as a crib or rollers can be fixed to the platform 11 to secure a boat thereto.

The arrangement and location of the steering and drive assemblies are such that the launcher can be manually controlled by a person standing within a boat contained by the launcher, when the latter is moving under its own power. This arrangement obviates any need for the person doing the driving to enter the water during the launching.

What I claim as my invention is:

1. A boat trailer and launcher comprising:
a platform having a front and a back end, at least one end of the platform being open to permit a boat to be floated onto the platform when the latter is submerged,
wheel means at both ends of the platform by which the platform can roll over the ground, the wheel means including at least one drivable wheel,
a source of motive power,
transmission means between said source and said drivable wheel for selectively rotating the drivable wheel to drive the platform over the ground,
the wheel means at one end of the platform being steerable to steer the platform while it is being so driven,
manual means for steering said steerable wheel means,
and at the front end of the platform coupling means by which the front end can be hitched to the back of a vehicle for trailing therebehind with the front end wheel means raised clear of the ground.

2. A boat trailer and launcher as claimed in claim 1 in which,
the wheel means at the back end of the platform includes two wheels, one at either side of the platform, both wheels being drivable through said transmission means,
the steerable wheel means comprising one wheel centrally of the front end of the platform.

3. A boat trailer and launcher comprising:
an elongated platform having a front and a back end,
both ends being open to permit a boat to be floated onto the platform from either end when the platform is submerged,
wheel means at both ends of the platform by which the platform can roll over the ground,
the wheel means at the back end of the platform comprising two drivable wheels, one at either side of the platform,
two columns raising vertically from the back end of the platform, one substantially above each said wheel, the columnar structures being spaced apart sufficiently to permit the passage of a boat therebetween,
a cross-member supported by and bridging between the columnar structures,
the wheel means at the front end of the platform comprising a single, steerable wheel centrally of said front end,
manual means for steering said steerable wheel mounted on the said cross-member, the manual means being manipulatable by one standing on a boat on the platform,
an engine mounted on said cross-member,
transmission means between the engine and the said two drivable wheels for selectively rotating said drivable wheels to drive the platform over the ground,
and at the front end of the platform coupling means by which the front end can be hitched to the back of a vehicle for trailing therebehind with the front end wheel means raised clear of the ground.

References Cited by the Examiner

UNITED STATES PATENTS

| | | | |
|---|---|---|---|
| 2,494,509 | 1/1950 | Gruska | 214—394 |
| 2,975,922 | 3/1961 | Dodge | 214—394 |
| 3,073,404 | 1/1963 | Hudson | 180—27 |
| 3,103,371 | 9/1963 | Young | 280—414 |
| 3,145,864 | 8/1964 | Arnold | 214—396 |

KENNETH H. BETTS, *Primary Examiner.*